Oct. 22, 1968  J. STOKES III  3,406,529
AUGER MOUNTING FOR ICEMAKING MACHINE
Filed March 17, 1967  2 Sheets-Sheet 1

INVENTOR:
JORDAN STOKES III
BY
Harrington A. Lackey
ATTORNEY

Oct. 22, 1968  J. STOKES III  3,406,529

AUGER MOUNTING FOR ICEMAKING MACHINE

Filed March 17, 1967   2 Sheets-Sheet 2

INVENTOR:
JORDAN STOKES III
BY
Harrington A. Lackey
ATTORNEY

United States Patent Office 3,406,529
Patented Oct. 22, 1968

3,406,529
AUGER MOUNTING FOR ICEMAKING MACHINE
Jordan Stokes III, 1206 Sudekum Bldg.,
Nashville, Tenn. 37219
Filed Mar. 17, 1967, Ser. No. 624,085
4 Claims. (Cl. 62—188)

ABSTRACT OF THE DISCLOSURE

An icemaking apparatus having an upright freezing chamber including a concentric standpipe projecting upwardly from the bottom of the freezing chamber, a driven shaft extending concentrically through the standpipe with an auger suspended from the shaft and about the standpipe, with a water-lubricated bearing between the auger and the standpipe.

Background of the invention

This invention relates to an auger-type machine for making ice particles.

Machines for making ice particles, chips or flakes are known in the art. Many of these ice machines include an upright cylindrical freezing chamber into which water is introduced, gradually frozen against the interior surface of the freezing chamber and fed upwardly by a rotating auger. Many of these machines also include mechanisms above the auger for squeezing water from the ice, deflecting or breaking the ice and discharging the ice into a storage container.

However, most of the auger-type icemaking machines include a sealed bearing in an opening in the bottom of the freezing chamber for rotatably receiving the driven auger shaft. It is this conventional means of mounting the auger shaft which produces failures in the machines. With continual use, water eventually penetrates the bearing seals, washing away the bearing lubricant, to cause bearing failure. When the bearings fail, the auger is no longer adequately supported for true concentric rotation within the cylindrical wall of the freezing chamber so that the helical blades of the auger either bind or scar the walls of the freezing chamber. Such failures, of course, result in a complete replacement of the part, or tedious and expensive repairs and down-time.

The U.S. Patent No. 3,205,673, issued Sept. 14, 1965, to Soderberg discloses a tapered auger rotatable within a freezing chamber in which the auger is driven by a shaft extending through an upwardly projecting shaft housing so that the auger is suspended from the shaft housing and rotatable therewith on bearings. Nevertheless, even the bearings of Soderberg are vulnerable to water damage.

Summary of the invention

This invention includes a means for mounting an auger for free rotatable movement within a freezing chamber in such a manner that the auger shaft and bearings will not be damaged by water in the freezing chamber. To the contrary, this invention contemplates an auger mounting in which the shaft bearing is exposed to the water for lubrication.

One object of this invention is to provide in an icemaking machine an auger suspended from the top of the vertical drive shaft to rotate about an upwardly projecting standpipe member with a water-lubricated bearing sleeve between the standpipe member and the auger not only for providing a rotary bearing for the auger, but also for maintaining the auger and shaft in constant concentric alignment with the standpipe and the freezing chamber.

Another object of this invention is to provide in an auger-type icemaking machine an auger having a bore for receiving a standpipe member integral with the projecting upwardly from the bottom of the freezing chamber, a water-lubricated bearing between the standpipe member and the bore, and means permitting the distribution of water in the freezing chamber substantially uniformly over the surface of the bearing.

Description of the preferred embodiment

Figures 1, 4:
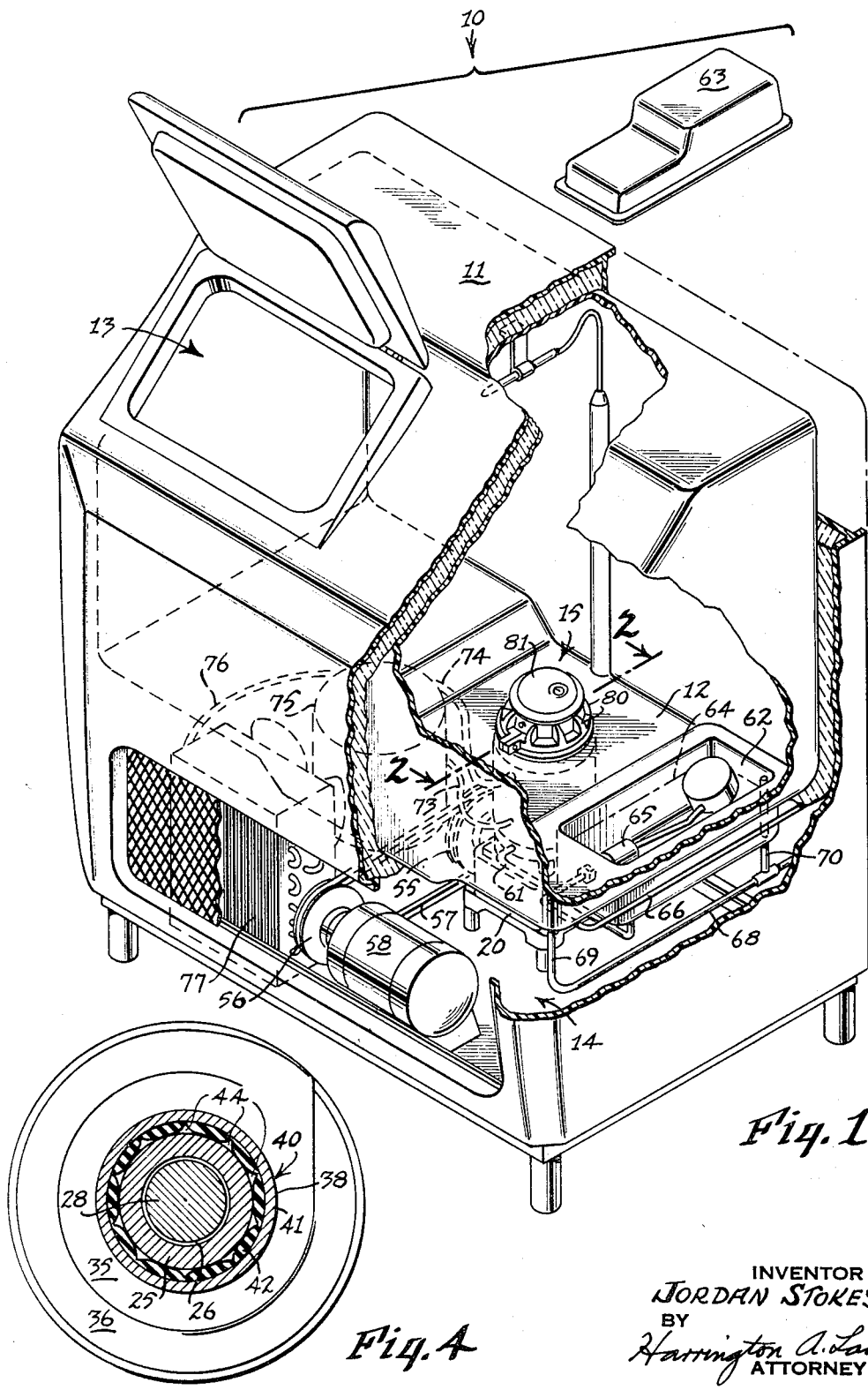
FIG. 1 is a perspective view of a machine for making and storing ice particles incorporating this invention, portions of which are broken away.
FIG. 4 is a section taken along the line 4—4 of FIG. 2.

Referring now to the drawings in more detail, FIG. 1 discloses an icemaking machine 10 including a cabinet 11 separated by wall 12 into an upper ice storage chamber 13 and a lower icemaking apparatus chamber 14.

Mounted in the apparatus chamber 14, but projecting through an opening in the wall 12 into the storage chamber 13 is an ice head assembly 15. The ice head assembly 15 (FIG. 2) includes a freezing chamber 16 having a bottom wall 17 mounted upon and spaced above a platform 18 by spacer members 19. In the drawings, the platform 18 constitutes the top wall of the reduction gear housing 20 supported in the apparatus chamber 14. The freezing chamber 16 also includes an upstanding closed side wall 22 having a circular cross-section, and disclosed in the drawings as cylindrical. The bottom of the side wall 22 is fixed by any convenient means such as the flanges 23 and bolts 24 to the bottom wall 17 in such a manner that the freezing chamber 16 will be watertight.

Projecting upwardly and forming an integral part of bottom wall 17 is a cylindrical standpipe member 25 which is concentric with the chamber wall 22. Extending upwardly through the bottom wall 17 and the standpipe member 25 is a continuously extending shaft opening or passage 26. As disclosed in the drawings, the standpipe member 25 extends almost the full height of the chamber wall 22.

An auger shaft 28, substantially longer than the shaft passage 26, extends vertically through the shaft passage 26. However, the diameter of the shaft 28 is slightly less than the diameter of the shaft passage 26, so that in normal operation the shaft 28 will rotate disengaged and out of contact with the shaft passage 26.

The top end 29 of the shaft 28 is reduced in diameter relative to the main body of the shaft 28 to provide an annular shoulder 30. The reduced shaft end 29 extends through a mating bore 31 of a frusto-conical cap 32. The bottom wall 33 of the cap 32 is fixed to the top of the auger 35 having cylindrical spiral flights 36. The top of the auger 35 is provided with a small bore 37 to receive the shaft 28. A large bore 38, communicating with the small bore 37, extends substantially the full height of the auger 35 for receiving both shaft 28 and the standpipe member 25. Moreover, the annular rim 39 formed by the intersection of the small bore 37 and the large bore 38 provides a stop for limiting the upward movement of a bearing sleeve 40.

Figure 3:
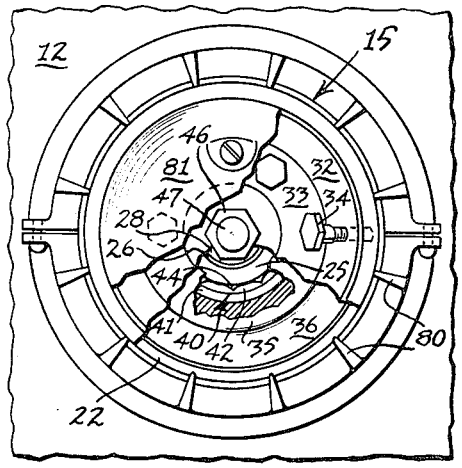
FIG. 3 is a top plan view of the ice head assembly taken substantially along the line 3—3 of FIG. 2.
Figure 2:
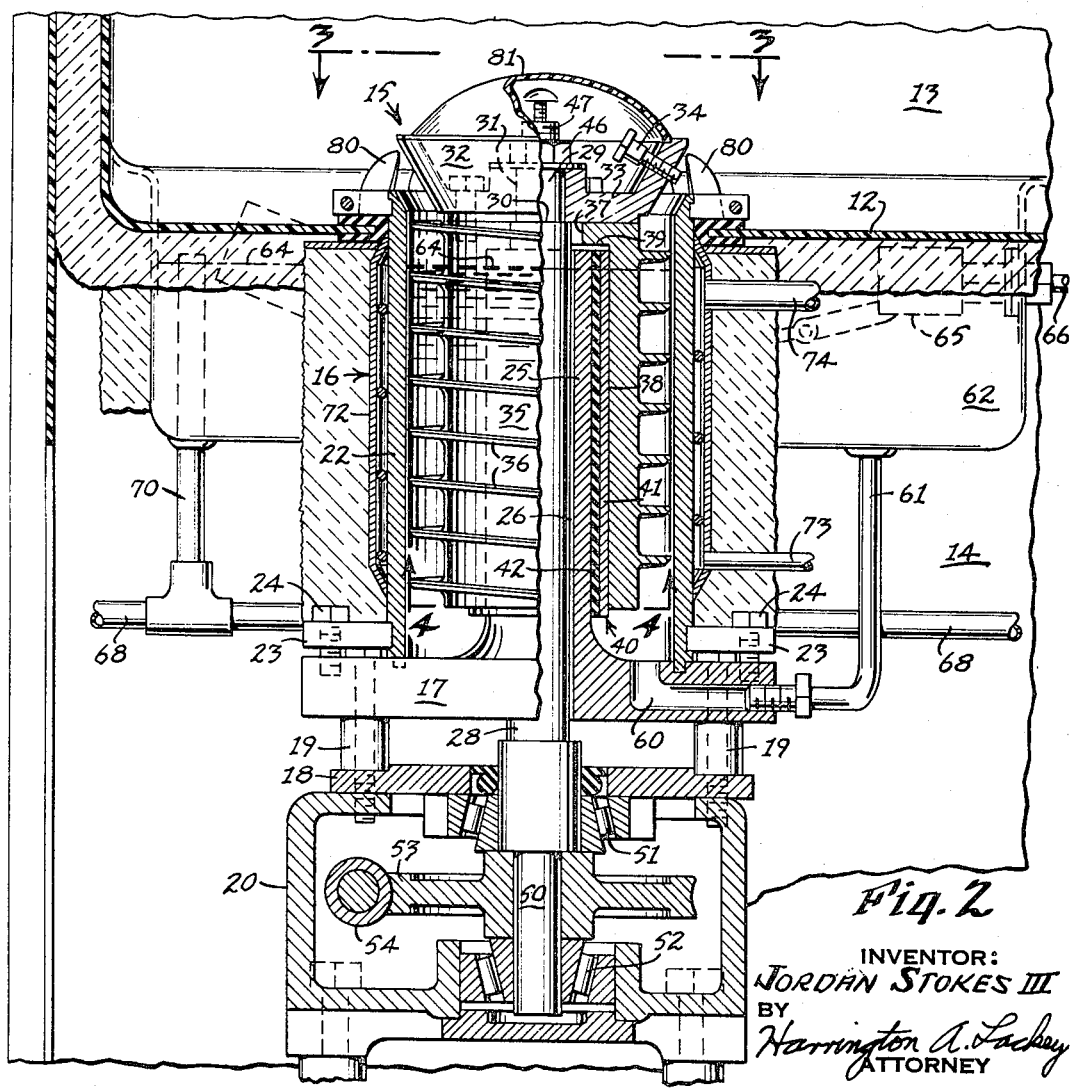
FIG. 2 is an enlarged section taken along the line 2—2 of FIG. 1.

The bearing sleeve 40, as best disclosed in FIGS. 2, 3 and 4, includes a cylindrical body member or bushing 41, to the inner surface of which is fixed bearing material 42, which is susceptible to lubrication by water, such as rubber. As actually used in the invention, the bearing sleeve 40 is a cutless bearing made by the B. F. Goodrich Company, the bearing material 42 being of rubber or rubber composition and the bushing 41 being of bronze. The sleeve 40 is fixed within and is substantially coextensive with the large bore 38. The thickness of the sleeve 40 is sufficient that the bearing material 42 is in snug bearing engagement with the cylindrical outer surface of the standpipe member 25. Thus, when the auger 35 is rotated by the shaft 28 and the bearing material 42 is lubricated with water, not only will bearing sleeve 40 slidably rotate about the standpipe member 25, but its longitudinal extent will provide more than adequate support to maintain the alignment of the auger 35 and the auger shaft 28 concentrically within the freezing chamber 16.

As will be noted in FIG. 2, the bottom of the auger 35 and the bottom of the bearing sleeve 40 are spaced above the bottom wall 17 to provide accessibility of the water in the freezing chamber 16 to the bearing sleeve 40. To provide substantial uniform distribution of the water in freezing chamber 16 over the surface of the bearing material 42, circumferentially spaced elongated grooves 44 are formed in the bearing material, as best disclosed in FIG. 4.

As has been previously discussed, the auger 35 is fixed to its shaft 28 through connections, such as bolts, to the bottom plate 33 of the conical cap 32, the bore 31 of which is fitted over the reduced top end 29 of the auger shaft so that the bottom plate 33 rests upon the shoulder 30 formed in the shaft 28. Moreover, the cap 32 is fixed to the top of the reduced portion of the shaft 29 by means of a nut 46 engaging the threaded extension 47 of the shaft 28. In this manner, the auger 35 is fixed to and suspended by the shaft 28 so that the auger 35 does not engage the standpipe member 25 at all, except through the bearing sleeve 40.

The bottom portion 50 of the shaft 28 is rotatably supported in the reduction gear housing 20 by means of upper thrust bearings 51 and low thrust bearings 52. Fixed to the bottom shaft portion 50 between the thrust bearings 51 and 52, the larger gear 53 meshes with the worm shaft 54 driven through pulleys 55 and 56 and belt 57 by the electrical motor 58 (FIG. 1).

Water is supplied to the freezing chamber 16 through water inlet 60 in the bottom wall 17 and inlet pipe 61 connected to the bottom of the float chamber 62. In normal operation, the float chamber 62 is closed by cover 63 (FIG. 1). The water level 64 in the freezing chamber 16 is maintained below the top of the standpipe member 25 by the float valve 65 controlling water entering the float chamber 62 from the inlet supply pipe 66.

A drain pipe 68 may also be included to drain water melting from the ice in the storage container 13 through branch pipe 69. Also, the overflow pipe 70 in the float chamber 62 is connected to the drain pipe 68.

The side chamber wall 22 is cooled to a low enough temperature to freeze the adjacent water in the chamber 16 by means of the evaporator chamber 72, which receives condensed liquid refrigerant through the bottom inlet conduit 73, and discharges the evaporated refrigerant gas through the larger upper pipe 74 to the compressor 75 (FIG. 1). Compressed refrigerant gas from the compressor 75 passes through the conduit 76 to the condenser 77. The liquid refrigerant from the condenser 77 moves through a conduit, and expansion valve, not shown, to the refrigerant inlet 73 and evaporator chamber 72, according to the conventional refrigeration cycle.

Although the conical cap 32 forms no part of this invention, nevertheless, it is disclosed as one means of squeezing the water from the ice discharged from the freezing chamber 16 by the auger 35. The cap 32 also fractures and deflects the ice laterally through the radial cutting or separating members 80, and the size of the ice is controlled through adjustment screw 34.

A dome 81 may be provided to protect the exposed parts on the top of the conical cap 32 from the ice and water in the storage chamber, if desired.

It will be apparent from the above description and drawings, that an icemaking machine 10, and particularly the ice head assembly 15, has been provided which will manufacture ice continuously and efficiently for longer periods of time than has heretofore been possible, because of the mounting structure for the auger 35 upon the standpipe member 25, and also because of the water lubricated bearing sleeve 40.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:
1. A machine for making ice particles comprising:
   (a) a freezing chamber including a bottom wall and an upstanding closed side wall having a circular cross section fixed to said bottom wall,
   (b) a cylindrical standpipe member forming an integral part of said bottom wall and projecting upwardly and concentrically within said side wall,
   (c) a continuous vertical shaft opening extending through and concentric with said integral bottom wall and standpipe member,
   (d) a shaft longer than and extending through said shaft opening, said shaft having a bottom end and a top end and a diameter slightly less than the diameter of said shaft opening,
   (e) means supporting said shaft for rotatable movement concentric with said shaft opening,
   (f) means for rotatably driving said shaft,
   (g) an auger received in said freezing chamber and having a concentric bore therethrough of slightly greater diameter than and disposed concentrically around said standpipe member,
   (h) means fixing said auger to said shaft so that said auger is suspended by said shaft in concentric spaced relation with said standpipe member,
   (i) a bearing sleeve fixed in said bore and having an annular inner bearing surface susceptible to lubrication by water and rotatably engaging said standpipe member,
   (j) said auger and said bearing sleeve having bottom ends spaced above said bottom wall so that said bearing sleeve is in communication with said water in said freezing chamber,
   (k) means for cooling said freezing chamber, and
   (l) control means for introducing water into said freezing chamber and for maintaining a water level in said freezing chamber below the top of said standpipe member.

2. The invention according to claim 1 in which said bearing surface is rubber.

3. The invention according to claim 1 in which said bearing sleeve is substantially coextensive with said standpipe member.

4. The invention according to claim 1 further comprising circumferentially spaced elongated grooves formed coextensively in said bearing surface.

References Cited

UNITED STATES PATENTS

| 3,160,020 | 12/1964 | Ross | 62—138 |
| 3,183,682 | 5/1965 | Conto | 62—354 X |
| 3,205,673 | 9/1965 | Soderberg | 62—354 X |
| 3,245,225 | 4/1966 | Wallace | 62—354 X |

ROBERT A. O'LEARY, *Primary Examiner.*

W. E. WAYNER, *Assistant Examiner.*